Figure 1:
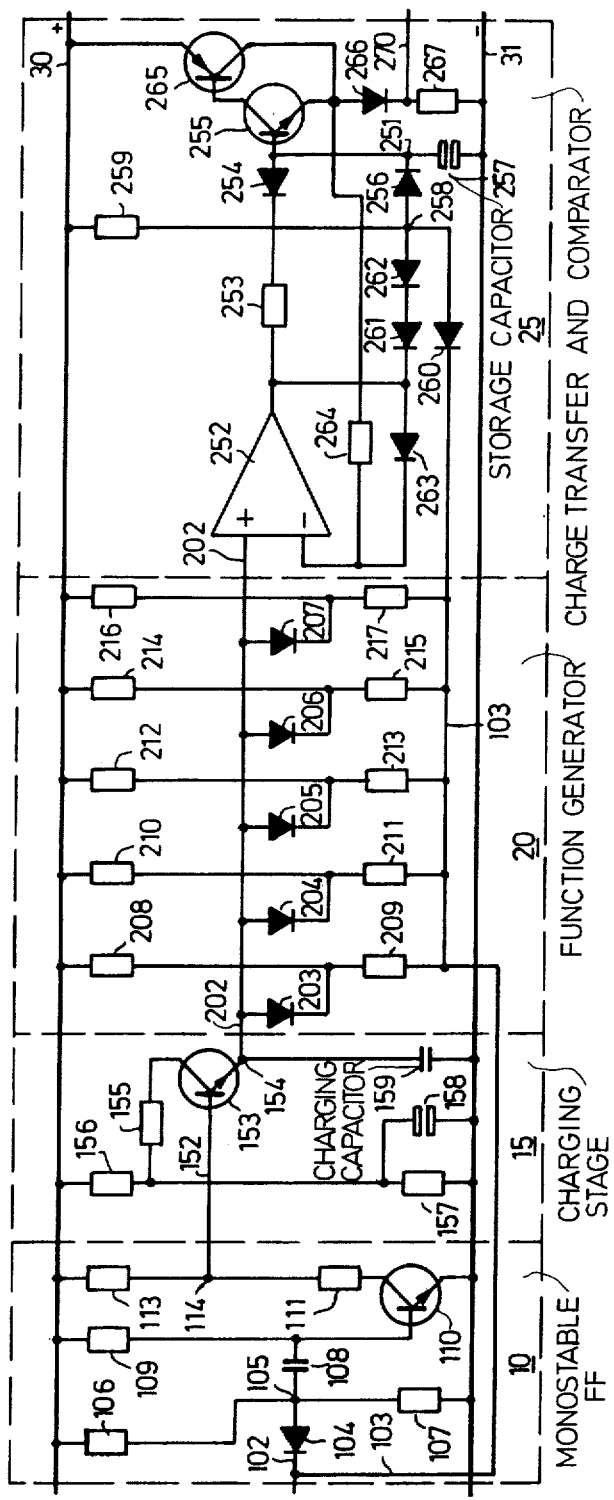

United States Patent [19]

Fleischer et al.

[11] 3,883,754
[45] May 13, 1975

[54] FREQUENCY-VOLTAGE CONVERTER CIRCUIT, PARTICULARLY FOR AUTOMOTIVE APPLICATIONS

[75] Inventors: Helmut Fleischer, Schwieberdingen; Eberhard Schnaibel, Hemmingen, both of Germany

[73] Assignee: Robert Bosch G.m.b.H., Gerlingen-Schillerhohe, Germany

[22] Filed: Feb. 7, 1974

[21] Appl. No.: 440,371

[30] Foreign Application Priority Data
Mar. 21, 1973 Germany............................ 2314016

[52] U.S. Cl............... 307/229; 328/142; 307/233 B
[51] Int. Cl............................................ G06g 7/24
[58] Field of Search........... 328/142; 307/229, 271, 307/233 B

[56] References Cited
UNITED STATES PATENTS

| | | | |
|---|---|---|---|
| 3,652,134 | 3/1972 | Hiscox | 307/233 |
| 3,689,778 | 9/1972 | Sharp | 307/233 |
| 3,770,327 | 11/1973 | Ruof | 307/233 |

Primary Examiner—John Kominski
Attorney, Agent, or Firm—Flynn & Frishauf

[57] ABSTRACT

A simple frequency-voltage converter circuit, particularly suitable for vehicle wheel brake anti-lock systems in which a voltage is derived representative of a wheel speed, from a tachometer generator, including a track-and-hold circuit in which a first charging capacitor is charged to a fixed value upon occurrence of the trailing flank of a pulse from the tachometer generator, and discharged during the pulse gap, and a charge transfer and comparator stage is connected thereto, including a second storage capacitor on which a charge is developed representative of the charge on a charging capacitor. The transfer and comparator stage includes an operational amplifier, connected to a charge diode, and a discharge diode, respectively, and rendering the charge and discharge diodes selectively conductive, the state of the storage and comparison capacitor being fed back to the input of the operational amplifier to effect comparison and hence control of the respective charge or discharge diode.

14 Claims, 2 Drawing Figures

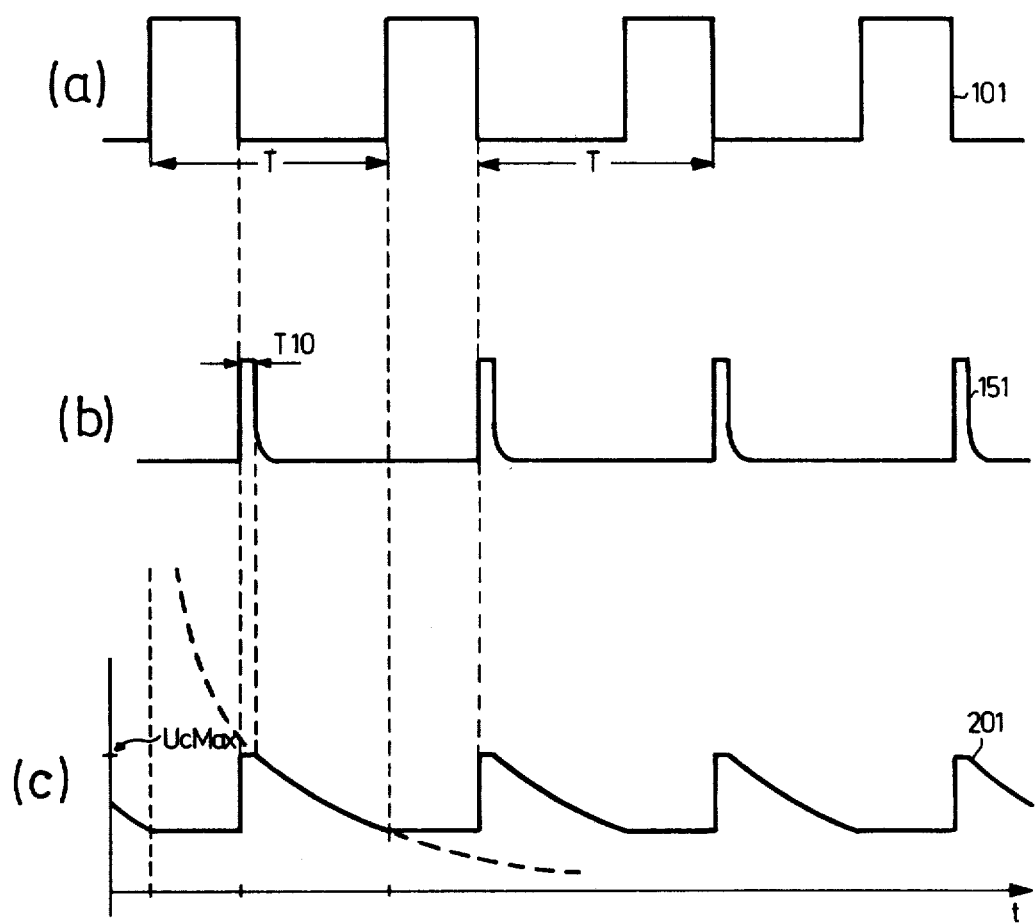

FREQUENCY-VOLTAGE CONVERTER CIRCUIT, PARTICULARLY FOR AUTOMOTIVE APPLICATIONS

The present invention relates to a frequency-voltage converter, and more particularly to such a circuit which is especially adapted for incorporation in an automotive vehicle brake anti-lock system.

Frequency-voltage converters have previously been proposed in which a signal having a frequency variation is wave-shaped to provide output pulses having a pulse repetition rate corresponding to frequency. The charge, or discharge state of a capacitor is compared with the state of a charge on a second capacitor. A function generator circuit is connected to the first capacitor so that the discharge rate thereof occurs in accordance with a hyperbolic function. The comparison between the charge state of the first and second capacitors provides an error signal, to modify the charge state on the second capacitor, so that its charge will have a certain proportionality with respect to frequency. The voltage thereacross, then, will be representative of frequency. Such circuits are customarily referred to as track-and-hold circuits.

Track-and-hold circuits can be used as frequency-voltage converters if the response time of the converter circuit is to be very short. This is a desirable feature and, frequently indeed, a requirement in vehicle wheel brake anti-lock systems. The frequency-voltage converter circuits are applied with output signals from a pulse source which provides a signal having a frequency corresponding to the speed of a vehicle wheel. The output signal has an ON-OFF (mark-space) ratio of the pulses which is independent of frequency.

Frequency-voltage converters, as proposed, use a first storage capacitor which is charged by a signal derived from the trailing flank of a differentiated signal; this capacitor is at least partially discharged during the gap between the next pulse. The subsequent input pulse terminates the discharge of the capacitor, so that the voltage thereon will retain a constant value. This voltage can then be compared with a voltage on a second storage capacitor. The voltage on the first storage capacitor then is used to control the charge on the second storage capacitor by, respectively, charging or discharging the second storage capacitor until the voltages across the two storage capacitors are equal. Circuits of this type, as previously proposed, require a fair amount of components, particularly the switching circuit to vary the voltage on the second storage capacitor and to compare the voltages between the two capacitors, that is, the circuit of the stage which provides for charge transfer and comparison between voltages of the two storage capacitors.

It is an object of the present invention to provide a frequency-voltage converter circuit which has low response time, provides an output signal which is representative of an input frequency, and which is simple to construct using a minimum of circuit components.

SUBJECT MATTER OF THE PRESENT INVENTION

Briefly, the charge transfer and comparison stage includes a discharge diode connected to the second storage capacitor, in order to discharge the second storage capacitor, which discharge diode is connected in series with a resistor, and to the output of an operational amplifier.

In accordance with a preferred form, the output of the operational amplifier is connected to a current supply line over the series circuit including at least a diode and a resistor; the second storage capacitor, preferably, can be charged over a charging diode.

The invention will be described by way of example with reference to the accompanying drawings, wherein:

FIG. 1 is a general schematic circuit diagram illustrating the circuit in accordance with the present invention; and FIG. 2 is a timing diagram illustrating pulses arising in the circuit of FIG. 1, in which graph (a) shows pulses arising at the input 102 of a monostable stage 10 of the circuit; graph (b) shows input pulses to the charge stage 15 and graph (c) shows the output voltage across the first storage capacitor 159 in charge stage 15, forming simultaneously the input voltage for the function generator 20 and the charge transfer and comparison stage 25.

The circuit has a group of interconnected stages: a monostable flip-flop 10 forming the input stage; a charging stage 15 with a main charging capacitor 159; a function generator stage 20; and a charge transfer and comparison stage 25 including a second storage or comparison capacitor 257.

The input 102 of the monostable flip-flop (FF) stage 10 is connected to a line 103, and the cathode of a diode 104, the anode of which is connected to a junction 105. Power is supplied over positive and negative buses 30, 31. Junction 105 forms the junction point of a voltage divider formed of resistors 106, 107, connected between buses 30, 31. Junction 105 is capacitively coupled by means of capacitor 108 to the base of a transistor 110. A base transistor 109 connects to positive bus 30. The emitter of the transistor 110 is connected directly to negative bus 31; the collector is connected over a voltage divider formed of resistors 111, junction 114, and resistor 113 to the positive bus 30. The junction 114 is connected by means of line 152, forming the output of the FF stage 10, to the charge stage 15.

Charge stage 15 has as active element a transistor 153, the base of which is connected to the output line 152 of the FF stage 10. The emitter of transistor 153 is connected to a junction 154. The collector of transistor 153 is connected over resistor 155 to the tap or junction point of a voltage divider formed by resistors 156, 157 and connected between buses 30, 31. The voltage divider resistor 157 is bridged by a capacitor 158, which has a high capacity. The junction 154, connected to the emitter of transistor 153 is connected to the charge capacitor 159. The relative capacity of the capacitor 158 is large with respect to that of charging capacitor 159. Junction 154, further, is connected by means of a line 202, forming the outputs from charging stage 15 to the next stage, that is, function generator 20. The output line 202 is, further, connected directly to the charge transfer and comparator stage 25.

Function generator stage 20 has a plurality of parallel connected diode-resistor circuits. Diodes 203, 204, 205, 206, 207 are each, respectively, connected to the junction point of voltage dividers formed of resistors 208, 209; 210, 211; 212, 213; 214, 215; 216, 217. One terminal of the voltage dividers is connected to positive bus 30, the other is connected to a line 103.

The charge transfer stage 25, connected to output line 202 of charging stage 15, has as its primary active element an operational amplifier 252. The non-inverting, direct input is connected to the output line 202 of the charging stage 15. The output of operational amplifier 252 is connected over a resistor 253 to a discharge diode 254 and to the base of a transistor 255. The discharge diode 254, the base of the transistor 255 and the cathode of a charge diode 256, as well as one terminal of storage capacitor 257 are well connected to a common junction 251. The second terminal of storage capacitor 257 is connected to negative bus 31. The anode of the charge diode 256 is connected to junction 258 which is coupled over resistor 259 galvanically with positive bus 30. The junction 258 is further connected through diode 260 to line 203. Junction 258 is further connected through two serially connected diodes 261, 262 to the output of the operational amplifier 252. A further diode 263 connects to the inverting input of the operational amplifier 252. Resistor 264 connects to the emitter of the transistor 255 as well as to the collector of transistor 265. The transistors 255, 265 are connected in a Darlington circuit. Diode 266 is coupled from the emitter of transistor 255 and the collector of transistor 265 to the output line 270 from the circuit. Output is taken across the output resistor 267 connected between the output line 270 and negative bus 31.

Operation, with reference to FIG. 2: Graph (a) shows the pulses 101 applied to the input 102 of FF stage 10; graph (b) shows the pulses 151 of the charge stage 15, and graph (c) shows the output voltage 201 appearing across capacitor 159 of charge stage 15, and applied over line 202 both to the function generator 20 as well as to the operational amplifier 252 of the charge transfer and comparator stage 25.

A tachometer generator of any known type provides output pulses, directly, or over a frequency doubler circuit, which may include a monostable FF stage (for example similar to stage 10) pulses 101 at the input line 102 of monostable FF stage 10.

The resistance relationship of input voltage divider 106, 107 is so selected that during the pulse duration of input signal 101, the maximum possible voltage at junction 105 is below the breakdown voltage of the emitter-base junction of transistor 110. If the input voltage 101 should exceed this value, diode 104 will block. During the pulse gap between pulses 101, the input voltage drops to zero. Diode 104 becomes conductive, and the voltage at junction 105 collapses. This voltage drop is transferred by capacitor 108, and controls transistor 110 to block. Voltage 151 at junction 114 rises, and only drops when, after re-charging of capacitor 108, a voltage of at least 0.6 V is applied to the base of transistor 110, independent of the input voltage 101. Line 152 connected to junction 114 thus provides a signal 151 (FIG. 2, graph (b)) having a pulse duration T10. The voltage divider formed of resistors 111, 112 determines the minimum voltage across the first, or charging capacitor 159. At the positive pulse of signal 151, transistor 153 of the charging stage is rendered conductive. The charging capacitor 159 can charge from the charge accumulated on the much larger capacitor 158 over resistor 155 and transistor 153. Resistance 155 is of low value. Charging capacitor 159, much smaller than the capacitor 158, will charge rapidly. Capacitor 158 prevents voltage fluctuations on line 30 due to high current drain. Charging capacitor 159 is charged upon occurrence of the trailing flank of input signal 101. The leading flank is not transmitted over diode 104 and thus does not trigger the monostable FF stage 10. As the signal 101 drops, voltage on line 103 likewise drops. When the first, or charging capacitor 159 has been charged, that is, after time T10 (graph (b)), the capacitor can discharge over function generator 20. Function generator 20 permits partial discharge of the charging capacitor 101 during the pulse gaps of the input signal 101.

The discharge curve, with respect of time, of the charging capacitor 159 must be a portion of a right-angle hyperbola, one asymptote of which is formed by the time axis. Such a hyperbola is shown in graph (c) in dashed lines. The particular function is generated by appropriate selection of the resistance values of the respective voltage dividers 208, 209 . . . 216, 217, as known. The dimensioning of the voltage divider is derived from the proportionality resulting from the parabolic relationship between discharge current and voltage on capacitor 159 to provide for the proper relationship between voltage and frequency.

The voltage across charge capacitor 159 in charging stage 115 and storage capacitor 257 in charge transfer and comparator stage 25 is compared during the pulse gap of the input signal 101. This comparison is carried out in stage 25. The voltage across the first, or charging capacitor 159 (graph (c) of FIG. 2) is connected to the direct input of the operational amplifier 252, and thereby sets its output voltage to a predetermined value which depends on the output voltage at the emitter of transistor 255. Thus, the discharge diode 254 is either blocked, or conductive, depending on the charge state of the second, or storage capacitor 257. Diode 260 is blocked in any event during the pulse duration. The charge state on storage capacitor 257 is thus determined in dependence on the voltage at the output of operational amplifier 252, that is, the charge on storage capacitor 257 is either increased by charging over resistor 259, junction 258 and diode 256, or discharged over diode 254 and resistor 253. The junction 258, further, provides current through diodes 261, 262 to the output of the operational amplifier controlled by signal 201 (FIGS. 2 — graph (c)). The voltage at junction 258, therefore, can exceed the voltage at the output of the operational amplifier 252 only by twice the intrinsic voltage of any one of the diodes 261, 262 (which are assumed to be identical). The maximum voltage at the output of the operational amplifier, itself, at the most can have the value of the full charge voltage of the charging capacitor 159, and the junction voltage at junction 258 thus can be higher than that voltage only by the inherent or intrinsic voltages of diodes 261, 262. During charging, the voltage across storage capacitor 257 thus essentially follows the output voltage of the operational amplifier 252. It is so controlled that the voltages on line 202 and at the anode of diode 266 are identical. The emitter voltage on transistor 255 depends on the voltage on storage capacitor 257 and thus provides negative feedback over the inverting input to the operational amplifier 252. This inverse feedback arises already at a voltage difference which is greater than the intrinsic voltage of the diode 263, which voltage difference is applied between the inverting input and the output voltage of the operational amplifier 252. A drop in the output voltage of the operational amplifier is not fed back over diode 263, however, so that the voltage across storage capacitor 257 can drop more rapidly than it can rise. Discharge over the discharge diode 254 and resistor 253 occurs at the instant in which the output voltage of the operational amplifier 252 drops, causing the discharge diodde 254 to become conductive. The voltage across the storage capacitor 257 is de-coupled over the complementary Darlington circuit formed by the transistors 255, 256; diode 266 is a temperature compensation diode to compensate for temperature relationships of the diodes in the function generator 20.

The discharge curve or discharge function (with respect to time) of the charging capacitor 159 must be accurately predetermined so that there will be accurate proportionality between frequency and voltage. Upon occurrence of the trailing flank of a pulse, and after rapid charging of the capacitor 159 to a value UcMax, and after time T10, the charging capacitor 159 will discharge slowly. The voltage 201 (FIG. 2, graph (c)) at capacitor 159 is shown as a rapid, straight jump when the capacitor is charged, to simplify the illustration. When a new pulse is applied to the input 102, then, as previously noted, this charge is terminated and the two voltages on the charging capacitor 159 and the storage capacitor 257 are compared. The voltage at the output line 270 from the circuit of FIG. 1 is thus determined by the voltage across the charging capacitor 159 of charging stage 15 at the instant that a new input pulse 101 occurs (see FIG. 2). The linear relationship of the voltage U across storage capacitor 159 with respect to frequency results in an inverse proportionality with respect to pulse repetition duration $T$ (FIG. 2) as follows:

$$U \sim f = \frac{1}{T} \qquad (1)$$

The above relationship requires the aforementioned discharge curve in the form of a right-angle hyperbola, in which the time axis forms one asymptote, and is shown in dashed lines superimposed upon the voltage diagram 201 of graph (c) of FIG. 2.

The function generator 20 can easily be constructed as an integrated circuit; likewise, the operational amplifier 252, as well as the remaining components (resistors, diodes and the transistors 255, 265) of the circuit 25 can readily be constructed as integrated circuits, so that the entire function generator can be inexpensively and easily made, while providing reliable output.

Various changes and modifications may be made within the scope of the inventive concept.

We claim:

1. Frequency-voltage converter circuit having a monostable flip-flop (FF) (10) to which a signal of varying frequency is applied;
    charge storage means (159) connected to the monostable FF (10) to be charged upon change of state thereof;
    a function generator (15) controlling the discharge of said charge storage means and providing for a hyperbolic discharge rate thereof;
    a storage capacitor (257) and a charge transfer circuit therefor, the charge storage capacitor being charged to a value representative of the charge, or remaining charge, of the charge storage means, after discharge through the function generator;
    wherein the improvement comprises an operational amplifier (252) forming part of the charge transfer circuit (25), and a discharge circuit for the storage capacitor (257) including a discharge diode (254), said discharge circuit being connected to and controlled by the output of the operational amplifier (252).

2. Circuit according to claim 1, comprising means (261, 262, 259) including resistance means connecting the output of the operational amplifier (252) to a source of supply (30, 31);
    and a diode (256) connecting the output of the operational amplifier to the storage capacitor (257) and to the source of supply to form a charging circuit for said storage capacitor.

3. Circuit according to claim 2, wherein the means connecting the output of the operational amplifier (252) to the source of supply (30) comprises diode means (261, 262).

4. Circuit according to claim 1, further comprising resistance means (253) interconnected between the output of the operational amplifier (252) and the discharge diode (254).

5. Circuit according to claim 1, wherein the operational amplifier (252) is connected to be voltage-sensitive and connected in a comparison circuit to compare the voltage on the charge storage means (159) and the voltage appearing at the output (270) of the converter circuit, said operational amplifier means being connected to and controlling discharge of the storage capacitor (257) when the voltage on the charge storage means (159) is less than the voltage at the output (270) of the converter circuit.

6. Circuit according to claim 1, further comprising diode means (263) connected between the inverting input of the operational amplifier (252) and the output of the operational amplifier;
    a de-coupling transistor circuit (255, 256), including at least one transistor (255), the base of the de-coupling transistor (255) being connected to the discharge diode (254), and an output electrode (emitter) of the transistor being coupled (264) to the inverting input of the operational amplifier (252).

7. Circuit according to claim 1, further comprising connection means (103) connecting the input signal (101) to the function generator (20) and to the charge transfer and comparator circuit (25) to control operation of the operational amplifier in accordance with the state of the input signal.

8. Circuit according to claim 3, further comprising connection means (103) connecting the input signal to the diode means (261, 262) and to the resistance means (259) to control the timing of charging and discharging of the storage capacitor (257).

9. Circuit according to claim 1, wherein the function generator comprises a resistance-diode network;
    and a compensating coupling diode (266) is provided connected to the output (270) of the converter circuit to compensate for temperature variations of the diodes in the function generator diode network.

10. Circuit according to claim 1, wherein the monostable FF (10) has an output circuit including a voltage divider (111, 113, 114), the output from the monostable FF being taken from the tap or junction point (114)

of the voltage divider and connected to the charging capacitor (159).

11. Circuit according to claim 10, further comprising a charge supply capacitor (158) having a capacitance which is high with respect to the capacitance of the charging capacitor (159);
- a controlled switch (153), the controlled switch being controlled from the monostable FF (10) and, selectively, connecting the charging capacitor (159) to be charged by charge stored on said capacitor (158) of large capacitance, and to isolate the charging capacitor (159) from said charge supply capacitor (158) and permit discharge through said function generator (20) and control of the charge transfer circuit (25) and hence the charge state on the storage capacitor (257).

12. Circuit according to claim 2, wherein the operational amplifier is connected to have a signal applied to one input thereof representative of the charge on the charging capacitor (159) and a signal applied to the other input thereof representative of the charge on the storage capacitor (257), said operational amplifier comparing said respective signals and providing an output which controls conduction of said discharge diode (254) or said charge diode (256), respectively, to provide a charge on the storage capacitor which will be representative of the charge on the charging capacitor (159) and to null any differences.

13. Circuit according to claim 12, wherein the discharge diode (254) is directly connected to the output of the operational amplifier to be controlled to be conductive thereby; and at least two serially connected diodes (261, 262) connecting the charge diode (256) to the output of the operational amplifier to provide different intrinsic voltage drops between the charge circuit including the charge diode (256) and the discharge circuit including the discharge diode (254) to provide for a control range.

14. Circuit according to claim 12, further comprising a negative feedback circuit (264, 263) between the output (270) of the converter circuit and the operational amplifier (252), said negative feedback circuit including a diode (263) to apply the negative feedback to the operational amplifier only when the charge diode (256) effects charging of the storage capacitor (257) to provide for rapid discharge of the storage capacitor (254) when controlled and commanded to discharge by the operational amplifier, but slower charge of the storage capacitor (257) when commanded and controlled by the charge diode (256) and upon application of said negative feedback through the negative feedback circuit.

* * * * *